C. Jillson,
Jaw Trap,
N° 22,078. Patented Nov. 16, 1858.
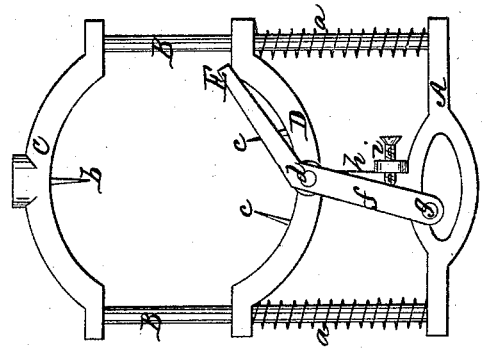
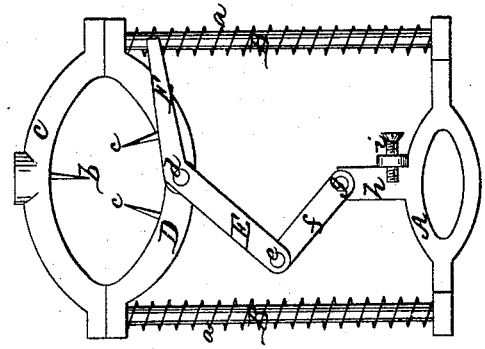
Witnesses.
Inventor.
C. Jillson.

UNITED STATES PATENT OFFICE.

C. JILLSON, OF WORCESTER, MASSACHUSETTS.

ANIMAL-TRAP.

Specification forming part of Letters Patent No. 22,078, dated November 16, 1858; Reissued May 7, 1867, No. 2,590.

*To all whom it may concern:*

Be it known that I, C. JILLSON, of the city and county of Worcester and State of Massachusetts, have invented certain new and useful Improvements in Animal-Traps; and I do hereby declare the following to be a full, clear, and exact description of the construction and operation of the same, reference being had to the accompanying drawings, making a part of this specification, in which—

Figure 1, represents a view of the trap as sprung or closed, and Fig. 2, represents the trap as set around, over, or against the animal's hole.

Similar letters in the separate figures denote like parts in both of them.

Letters Patent of the United States were granted to me on the 6th day of January, 1857, for an animal trap that was to be placed around the animal's hole, so that the trap became as it were a part of, or a prolongation of the hole, but in this trap the forks or spears were forced into the hole.

The nature of my present invention consists in so making the trap, as that the hole shall close up or collapse, and thus bring up the forks or spears, as will be shown hereafter.

To enable others skilled in the art to make and use my invention, I will proceed to describe the same with reference to the drawings.

A, represents the rear of the trap to which the several parts are connected. In this piece A, may be an opening for fastening the trap, either by a chain strap, string, or otherwise. Two rods B, B, connect the piece A, with the bow or yoke C, this much of the trap being rigid.

D, is a cross head sliding on the two rods B B, and forced by two coiled springs *a, a,* toward the bow, or yoke C. The cross head is curved in the reverse of the curve of C, so that when the two (C, and D) are sprung together the opening or hole between them shall be of an elliptical form. There may be one or more spears or points *b* on the bow C, as also one or more *c* on the movable part or cross head D.

E, is a trigger pivoted to D, at the point *d*, it is also pivoted at *e* to a link *f*, which link is in turn pivoted at *g*, to the arm *h*, which is fast to or a part of the rear piece A. The trigger E, and link *f*, form a toggle joint, and when the movable piece D, is brought down against the springs *a, a,* until the pivoted points *d, e, g,* are in line, it will stand so.

*i* is a set screw, against which the arm or sear of the trigger E, comes, when the trap is set as shown in Fig. 2. This set screw is to regulate the amount of motion or power that will let off the trap, so that it shall go more or less easy as may be desired.

When the trap is set, as shown in Fig. 2, it will be seen that the opening between the two pieces C, D, is much enlarged; and that the point of the trigger projects over or into said open space, so that the animal in passing through between the bows C, D, which make an extension, continuation, or prolongation of his hole, will move said trigger, and trapping the toggle joint, allow the springs *a, a,* to force up the movable piece D, and thus contracting or closing the hole, to force the points or spears into it and thus secure it.

The trap is light, small, cheap, and simple and can be set, hung, or placed over or around a hole almost anywhere. Or if not immediately over or around the hole, a board, brick or any other continuation of the hole may be made, so as to cause the animal to pass through between the pieces or bows C, D, in going to, or coming from their hiding places.

I am aware that, rat traps have been made where the jaws have been sprung toward each other; and that a single jaw has been made to move in the arc of a circle. These I do not claim, but What I do claim as new and desire to secure by Letters Patent is—

A rat or animal trap, in which the jaws are moved from each other in a plane, and thus enlarge the opening between them, and which when tripped shall close up, or contract the said opening, substantially as herein described and represented, and for the purpose set forth.

C. JILLSON.

Witnesses:
 W. W. RICE,
 T. L. NELSON.

[FIRST PRINTED 1911.]